(12) United States Patent
Singhvi et al.

(10) Patent No.: US 12,485,028 B2
(45) Date of Patent: Dec. 2, 2025

(54) PERCUTANEOUS IMPLANT DELIVERY SYSTEM

(71) Applicant: SAHAJANAND MEDICAL TECHNOLOGIES LIMITED, Gujarat (IN)

(72) Inventors: Abhijeet Singhvi, Gujarat (IN); Chirag Maheshbhai Solanki, Gujarat (IN); Shivanshu Pandey, Uttar Pradesh (IN); Akashkumar Ashokbhai Munjani, Gujarat (IN)

(73) Assignee: SAHAJANAND MEDICAL TECHNOLOGIES LIMITED, Gujarat (IN)

( * ) Notice: Subject to any disclaimer, the term of this patent is extended or adjusted under 35 U.S.C. 154(b) by 719 days.

(21) Appl. No.: 17/816,293

(22) Filed: Jul. 29, 2022

(65) Prior Publication Data

US 2023/0248555 A1 Aug. 10, 2023

Related U.S. Application Data

(63) Continuation of application No. PCT/IN2022/050539, filed on Jun. 13, 2022.

(30) Foreign Application Priority Data

Feb. 8, 2022 (IN) .............................. 202221006698

(51) Int. Cl.
*A61F 2/95* (2013.01)
*A61F 2/24* (2006.01)
*A61F 2/966* (2013.01)

(52) U.S. Cl.
CPC .............. *A61F 2/95* (2013.01); *A61F 2/9517* (2020.05); *A61F 2/2436* (2013.01); *A61F 2/966* (2013.01)

(58) Field of Classification Search
CPC ........ A61F 2/2427; A61F 2/2436; A61F 2/95; A61F 2/9517; A61F 2/966; A61F 2002/9534; A61F 2/962
See application file for complete search history.

(56) References Cited

U.S. PATENT DOCUMENTS

| | | | |
|---|---|---|---|
| 9,061,119 B2 | 6/2015 | Le et al. | |
| 2013/0297011 A1 | 11/2013 | Morris et al. | |
| 2019/0038443 A1* | 2/2019 | Sicotte | ..................... A61F 2/885 |
| 2019/0247211 A1* | 8/2019 | Gilmartin | ............... A61F 2/966 |

OTHER PUBLICATIONS

International Search Report for Application No. PCT/IN2022/050539, three pages, dated Nov. 7, 2022.
Written Opinion of the ISA for Application No. PCT/IN2022/050539, five pages, dated Nov. 7, 2022.

* cited by examiner

*Primary Examiner* — Melanie R Tyson
(74) *Attorney, Agent, or Firm* — Nixon & Vanderhye P.C.

(57) ABSTRACT

A prosthetic implant catheter delivery system is described. The delivery system includes a handle, a capsule, a tip, and a catheter assembly. The catheter assembly includes an outer shaft, a stability shaft, a catheter shaft, an inner shaft, and a guidewire shaft where the catheter shaft and the inner shaft (combinedly with the guidewire shaft) are utilized in the implant loading, positioning, and deployment. Only the stability shaft is fixed. The handle includes screw-based primary rotational mechanism and secondary rotational mechanism. The secondary rotational mechanism also includes a push-pull mechanism. The delivery system has improved pushability and controllability.

12 Claims, 9 Drawing Sheets

PERCUTANEOUS IMPLANT DELIVERY SYSTEM

CROSS REFERENCE(S) To RELATED APPLICATIONS

This application is a continuation of PCT Application No. PCT/IN2022/050539, filed Jun. 13, 2022, which claims priority to Indian Application No. IN202221006698, filed Feb. 8, 2022 the entire contents of each being hereby incorporated by reference.

TECHNICAL FIELD

The technology described herein relates to an implant delivery systems and methods to position and deliver a prosthetic implant using a percutaneous implant catheter delivery system.

BACKGROUND

Proper functioning of different organs is essential for proper functioning of a human or animal body. However, due to factors like age, disease, infections or genetic disorder, the working efficiency of the organs reduces significantly and many times that may be a severe and potentially life-threatening condition. For example, in a human heart, there are four valves and one common ailment that occurs in valves is calcification resulting in abnormal stiffening and narrowing of the flow area of the valve that restricts the blood flow e.g., in case of aortic stenosis, flow area of aortic valve reduces and that restricts the flow of blood from the ventricle into the aorta. Aorta is main artery that supplies blood to different human body parts and therefore, aortic stenosis may result in fatality. To treat such ailments, deployment of prosthetic implants has been one widely accepted medical procedure.

Conventionally, implant replacement used to be an open-cavity surgery in which operator has to open the relevant part of the patient to access a particular organ e.g. opening of the thoracic cavity to access the heart. However, in recent years, an alternative less invasive transcatheter approach has been developed that delivers a prosthetic implant using a catheter trans-vascularly e.g., through femoral artery, transapically, transaortic, trans-axillary etc.

Trans-vascularly deliverable prosthetic implant usually comprises a collapsible and expandable frame made of metal, alloy, non-metal, shape-memory alloy, biological tissues, polymeric materials or a combination thereof. Collapsibility and expandability of the frame or stent make them transportable through narrow diameter of the artery and its material properties and structural design keeps them stable and fixed at deployment site. However, during the procedure, implant delivery system plays a vital role as the operator's maneuvering actions at proximal end (handle) of a delivery system directly impacts the positioning, movement of the distal section (tip and capsule), and performance of the implant after the deployment. State of the art explains many approaches and mechanisms to perform this procedure with better trackability, pushability (force transfer), flexibility, precise positioning etc. Prior arts also provide knowledge related to usage of different materials to obtain less friction, low profile etc. However, catheters for trans-vascular implant replacement still have some shortcomings related to trackability, pushability, sheathing/re-sheathing and robustness which directly affect positioning and performance of the prosthetic implant during and after the deployment. Positioning of the prosthetic implant is directly linked with pushability i.e., force transfer from handle to tip region, and sheathing/re-sheathing i.e., movement of the capsule over the collapsed implant.

Hence, there is a need to provide a catheter delivery system for trans-vascularly deliverable prosthetic implant to avoid the shortcomings known in the art and specifically to provide a catheter delivery system that gives better delivery and deployment performance, ergonomic in use, compact and has sturdy structural design. Another objective is to provide a prosthetic implant delivery system that has improved sheathing/re-sheathing by providing a combination of more precise macro movement to the capsule over the collapsed implant and micro movement to the implant for deployment thereof.

SUMMARY

The subject technology is illustrated, for example, according to various aspects described below.

In some example embodiments, a percutaneous catheter for delivery of an implant comprises a primary rotary knob engaged with a threaded wheel through threads. The threaded wheel connected with a primary screw shaft. The primary screw shaft is a hollow cylinder with continuous spiral groove cut on its peripheral surface. A casing is attached to a handle housing and encompassing the primary screw shaft inside the casing. At least one casing slot provided on peripheral surface of the casing. An indicator pin connected to a catheter shaft and engaged in the continuous spiral groove of the primary screw shaft, such that the indicator pin projects through the casing slot and only movable in longitudinal direction. The catheter shaft connected with the indicator pin at one end and a capsule attached on an other end. The catheter shaft moves in longitudinal direction on longitudinal movement of the indicator pin due to rotary movement of the primary screw shaft caused due to rotating the primary rotary knob.

It will be appreciated that the above-described features are merely examples and other features, aspects, and advantages of the subject matter are further illustrated in the figures and described in the corresponding description below.

BRIEF DESCRIPTION OF ACCOMPANYING DRAWINGS

The detailed description is described with reference to the accompanying figures.

DETAILED DESCRIPTION

In some example embodiments, a catheter delivery system is provided and specifically a catheter for trans-vascularly delivering and deploying a prosthetic implant in a human or animal body (e.g., a transcatheter delivery system). The catheter comprises a distal section, a middle section, and a proximal section. The proximal section remains outside the human/animal body and comprises a handle housing that encompasses mechanisms to control the movements at the distal section of the catheter. The distal section comprises a tip and a capsule assembly wherein, in a loaded state, the capsule assembly comprises a prosthetic implant. The middle section is connected proximally with the handle housing and distally it connects to the distal section.

The middle section is situated between the handle housing and the capsule assembly. The middle section comprises a plurality of concentric shafts where all the shafts are at least present over one fourth of the total length of the middle section. The middle section has a guidewire shaft, an inner shaft, a catheter shaft, a stability shaft, and an outer shaft. The guidewire shaft is the innermost shaft and goes through the inner shaft concentrically. The guidewire shaft and the inner shaft are connected through some crimped points on their peripheral surface area. The guidewire shaft and the inner shaft, together, start from a proximal-most side of the proximal section and the guidewire shaft goes till a distal-most side of the distal section and the inner shaft goes till proximal side of the distal section. The inner shaft goes through the catheter shaft concentrically. Similarly, the catheter shaft goes through the stability shaft concentrically and the stability shaft is concentrically situated inside the outer shaft. Hence, over the length of the middle section at a point where all shafts are present, cross sectionally and from the center; the order of the shafts is the guidewire shaft, the inner shaft, the catheter shaft, the stability shaft, and the outer shaft where all the shafts have a common center point.

One end of the guidewire shaft, the inner shaft, the catheter shaft, and the stability shaft remain connected to a distal side of the proximal section, the handle housing, whereas the outer shaft is not connected to the distal side of the proximal section (the handle housing), and it is slidable over the stability shaft. An end of the outer shaft closer to the distal side of the proximal section comprises a hub through which it can be fixed over the length of the stability shaft. The other ends of the outer shaft and the stability shaft are not connected to any element of the catheter delivery system.

The distal section of the catheter delivery system mainly comprises the capsule assembly, a tip and the inner shaft. The capsule assembly includes a capsule that is a cylindrical structure, an implant holding region and at least an implant holder. The implant holding region is a space inside the capsule where the prosthetic implant is loaded in compressed form and the capsule keeps the implant in compressed form until it is moved to uncover the prosthetic implant for expansion and deployment through delivery mechanism. The implant holder is a hub-like cylindrical structure fixed on the inner shaft and situated inside the capsule at an end towards the proximal section. The implant holder has three protrusions on its peripheral surface which are circumferentially at equal distance and angle from each other. These protrusions are to engage with implant at the time of loading the implant and to disengage at the time of deployment. The inner shaft extends from the middle section, passes through the capsule, and ends near the proximal side of the distal section. As discussed above, the inner shaft concentrically comprises of the guidewire shaft. The tip is an atraumatic structure, a combination of a cylindrical part and a conical part. The cylindrical portion of the tip goes inside the capsule while conical portion locks against the capsule closing the capsule opening completely in loaded form.

The capsule of the distal section is seamlessly connected to the other end of the catheter shaft. The stability shaft is not extended till the distal section of the catheter delivery system, and it terminates somewhere over the length of the catheter shaft. Similarly, the other end of the outer shaft is also not extended till the distal section of the catheter delivery system, and it terminates somewhere over the length of the stability shaft.

The proximal section comprises mainly a screw-based mechanism for causing movement at the distal section and specifically for moving the capsule and the inner shaft. The proximal section is a handle of the catheter delivery system that remains outside the animal or human body. The handle comprises a handle housing, a handle housing cap, a primary screw shaft, a casing, a threaded wheel, a primary rotary knob, an indicator slot, an indicator pin, a ratchet spring, a ratchet collar, a release button, and a push-pull assembly comprising a push-pull button, a secondary rotary knob, a secondary screw shaft and a push-pull cap.

The catheter shaft from the middle section extends proximally into the handle and fixed to a catheter hub. The catheter hub further comprises an indicator pin. The primary screw shaft is a hollow shaft with grooves cut on its peripheral surface in a spiral manner. The grooves are deep enough to communicate with the hollow cylindrical portion of the primary screw shaft. The catheter hub is accommodated in the hollow portion of the primary screw shaft. Further, the primary screw shaft is disposed in a casing. The casing is a hollow cylinder that has longitudinal casing slots on its peripheral surface area. The indicator pin attached to the catheter hub is accommodated in the wide-enough continuous spiral groove created on the periphery of the primary screw shaft. The primary screw shaft is attached with the casing and the casing is attached with the handle housing in such a manner so that the primary screw shaft is rotatable on its axis. However, the longitudinal movement of the primary screw shaft is restricted. The handle housing comprises an indicator slot that coincides with one of the longitudinal casing slots and the indicator pin passes through the groove on primary screw shaft, the casing slot, and the indicator slot.

On rotating the primary screw shaft, the indicator pin moves in longitudinal direction within the indicator slot due to its constrained axial rotation. While travelling in longitudinal direction, the indicator pin also travels within the continuous spiral groove of the primary screw shaft due to rotation of the primary screw shaft. Based on the direction of the rotation, the indicator pin moves either towards the primary rotary knob or away from the primary rotary knob. Further, the indicator pin is connected to the catheter hub and the catheter hub also moves linearly along with the indicator pin inside the primary screw shaft on rotation of the primary screw shaft. Furthermore, the catheter hub is connected the catheter shaft. Hence, the catheter shaft also moves in longitudinal direction on rotating the primary screw shaft.

In addition, the peripheral surface area of the primary screw shaft, except the grooves, has at least one screw shaft protrusion that is perpendicular to the peripheral surface area. Opposite to the screw shaft protrusion, the casing has at least one protrusion slot to accommodate the screw shaft protrusion. The protrusion slot is designed to occupy the screw shaft protrusion in such a manner so that there is no relative movement between the casing and the primary screw shaft.

Proximal end of the primary screw shaft is attached to a ratchet collar that has a plurality of sockets arranged in a circular manner on its cross-sectional proximal side and away from the center. Opposite to this collar is a ratchet wheel which has a plurality of cogs arranged in a circular manner on its cross-sectional distal side and away from the center. These cogs are designed to get accommodated in the sockets on the ratchet collar in such a manner so that there is no loose movement. A person skilled in the art can understand that location of the sockets and the cogs can be changed and still the same functional effect can be obtained e.g. the ratchet collar can have a plurality of cogs in place of sockets and the ratchet wheel can have a plurality of sockets in place of cogs. Both the arrangements can function in the manner as described herein. The cogs and the sockets have at least one side tapered in such a way so that the ratchet wheel gets disengaged from the ratchet collar if the movement of indicator pin is restricted against the rotation of the primary rotary knob. This is possible due to placement of a ratchet spring behind the ratchet wheel and towards the primary rotary knob. The ratchet spring abuts with the ratchet wheel on distal side and situated on the threaded wheel on proximal side. The threaded wheel has threads partially on its periphery and towards proximal side. The threaded wheel is connected with the primary rotary knob through these threads. The other end of the threaded wheel is connected with the ratchet wheel. In normal functioning, the ratchet wheel is in fixed connection with the ratchet collar and in turn with the primary screw shaft. However, in a situation where the indicator pin is not able to move towards the primary rotary knob due to restricted primary screw shaft rotation, the cogs of the ratchet wheel disengage from the slots of the ratchet collar due to tapered shape of the cogs and the slots. The cogs remain in constant touch with the cross-sectional surface of the ratchet collar due to continuous force exerted by the ratchet spring on the ratchet wheel. The cogs slip-out from the sockets and move in the next sockets due to continuous force exerted by the ratchet spring on the ratchet wheel. This mechanism provides additional safety and deployment indication during the procedure by producing an audible sound and this sound acts as a feedback mechanism too. The operator performing the procedure receives the feedback related to the primary screw shaft movement in three ways. First feedback is visual in nature—the indicator pin stopes moving over the indicator slot and position of the indicator pin provides information as well. Second type of feedback is tactile in nature—the disengagement of the ratchet wheel from the ratchet collar is sensed by the operator due to change in force required for rotating the primary rotary knob. The third feedback medium is sound—additional rotation of the primary rotary knob after disengagement of the ratchet wheel with the ratchet collar creates audible sound due to constant touch between them that indicates that the primary screw shaft is not moving on its axis.

Further, one another safety mechanism employed in the catheter delivery system is implementation of a release button. The release button is attached to an arm and the arm is attached to the handle housing through a hinge. On pressing the release button, one end of the arm, attached to the release button, moves in downward direction and, due to the hinge, an other end of the arm moves in upward direction. On un-pressing the release button, it comes back to its original position due to a spring placed below the release button. The other end of the arm also has a spring supported shock dampener that provides a cushioning effect to the indicator pin. The release button is arranged inside the handle housing in such a way so that the other end of the arm comes in movement path of the indicator pin and restricts the movement of the indicator pin at a pre-defined location. For further movement of the indicator pin, the release button needs to be pressed which lifts the other end of the arm from the indicator pin's movement path and provides unrestricted movement path to the indicator pin.

Further, the handle housing has a housing cap that is in threaded connection with proximal end of the handle housing where the housing cap has required spaces on its center and on its cross-sectional side to accommodate other elements.

In addition, the catheter delivery system has a secondary rotational mechanism that is connected with the inner shaft and is situated behind the proximal end of the handle. The secondary rotational mechanism comprises a secondary screw shaft, a secondary rotary knob and a push-pull assembly comprising a pull shaft, a push-pull button, two connectors and a push-pull cap. The pull shaft is attached to the push-pull cap. The push-pull shaft is situated inside the hollow cavity of the threaded wheel, but the push-pull shaft is not connected to the threaded wheel or the handle housing. The push-pull cap has the two connectors, each connector's one end is attached to a push-pull button that is situated on peripheral surface of the push-pull cap. There are two push-pull buttons which are situated at 180° distance from each other i.e., the push-pull buttons are situated opposite to each other, and each comprises a spring to move it back to its original position after pressing. On pressing the push-pull button, another end of the connector moves away from its original position in radial direction i.e., towards the center of the push-pull cap. The other end of the connector comprises a stopper that is projected in outwardly direction from the center of the push-pull cap. By pressing both the push-pull buttons situated on the periphery of the push-pull cap, the other ends of the connectors move inwardly towards the center of the push-pull cap and these other ends of the connectors are inserted inside the handle housing cap through the spaces formed on its cross-sectional side. After insertion, on releasing the push-pull button, the other ends of the connector come to their original position. The stoppers situated on the other ends of the connector engages with the inside structure of the housing cap and the push-pull cap gets connected with the housing cap in fixed manner and in turn with the handle housing.

Further, the secondary screw shaft is in threaded engagement with the secondary rotary knob and the secondary screw shaft is fixedly connected with the inner shaft too. The secondary rotary knob is situated proximally to the push-pull but not attached to the push-pull cap. On rotating the secondary rotary knob, the inner shaft moves in longitudinal direction either in forward or backward direction based on the direction of rotation of the secondary rotary knob. Inner shaft movements, with respect to the capsule, caused due to the secondary rotary knob rotation is useful in small adjustments required at the time of prosthetic implant loading, positioning or during deployment. Also, for quick movement of the inner shaft, with respect to the capsule, the push-pull cap can be disengaged from the housing cap by pressing the push-pull buttons and pulling the secondary rotational mechanism towards the operator. The secondary rotary knob is situated on proximal side of the push-pull cap and due to the backward movement of the push-pull cap, the secondary rotary knob also moves backwards and in turn the inner shaft moves as well with respect to the capsule.

The inner shaft starts from extreme proximal end of the secondary screw shaft and passes through the secondary rotary knob, the push-pull cap, the push-pull shaft, the primary screw shaft, the catheter shaft and ends near the proximal side of the distal section. The extreme proximal end of the secondary screw shaft is used as a port for guidewire insertion and the guidewire travels through the entire length and exits from the tip on the other end. Further, a guiderail is also present on periphery of the secondary screw shaft that prevents unwanted rotation of the secondary screw shaft.

The catheter delivery system according to certain example embodiments of the present disclosure utilizes two movement mechanisms for loading, positioning, and deployment of the prosthetic implant. The catheter shaft is connected with the primary screw shaft through the catheter hub. On rotating the primary rotary knob, the catheter hub moves linearly inside the primary screw shaft due to its engagement with the continuous spiral groove on the peripheral surface area of the primary screw shaft where the primary screw shaft is restricted for any movement on its longitudinal axis. The catheter shaft's backward or forward movement depends on the direction of the rotation of the primary rotary knob. The distal end of the catheter shaft has the capsule assembly where the prosthetic implant is loaded in compressed form using a specially designed loading device. In loaded state, the implant resides inside the capsule on the guidewire shaft in the implant holding region and one end of the implant engages with the implant holders.

In the secondary rotational mechanism, the inner shaft can be moved in small adjustments using secondary screw shaft or the inner shaft, along with guidewire shaft, can be moved quickly using the push-pull mechanism.

During the deployment, the catheter shaft is moved backwards using the primary rotary knob to uncover the prosthetic implant. There is an indicator pin connected to the catheter hub connected to the catheter shaft and indicates the extent of implant uncovering on a scale displayed on the handle housing. After a certain extent e.g. 70% deployment of the prosthetic implant, the indicator pin hits the release button and the operator realizes through visual, tactile, and audible mechanisms, which are explained earlier, that the release button needs to be pressed. Till this extent of implant uncovering, the deployment process can be reversed, and the implant can be recaptured inside the capsule, or the implant can be retrieved from the human or animal body. If the operator decides for further uncovering of the implant from the capsule, the operator actuates the release button. On pressing the release button, the restriction in front of the indicator is lifted and the catheter hub becomes free to move further. On complete uncovering of the implant, the implant disengages from the implant holders automatically and deploy at the deployment location.

According to certain example embodiments the implant may be, but not limited to, a stent, a valve, a mesh, a balloon, a patch, a drug-containing matrix, a shunt, or a combination thereof.

According to certain example embodiments, different elements, all or selected ones, of the assembly are connected using adhesive, sealant, glue, threads, welding, other mechanical connection measures known in the art, other chemical connection measures known in the art or a combination thereof.

According to certain example embodiments, the push-pull button may have various configurations or mechanisms to get attached to the push-pull cap, specifically selected from, but not limited to, hook, threads, lock-pin, switch (on/off), Velcro-based, magnet-based or a combination thereof.

In certain example embodiments, the implant is used in treating any abnormality or in any medical procedure related to heart, kidney, lever, brain, pancreas, lungs, digestive system, endovascular system, any tract, duct or any conduit in animal or human body. More specifically, the implant can be deployed in an artery, vein, heart valves, esophageal duct, bile duct, urinary tract, alimentary tract, tracheobronchial tree, cerebral aqueduct or genitourinary system of an animal or human body.

Now, referring to the figures, wherein the elements are labelled with like numerals throughout the several Figures. Further, reference is made to the accompanying drawings which form a part hereof, and in which is shown by way of illustration. It is to be understood that other embodiments may be utilized, and structural changes may be made without departing from the scope of the invention.

Figure 1:
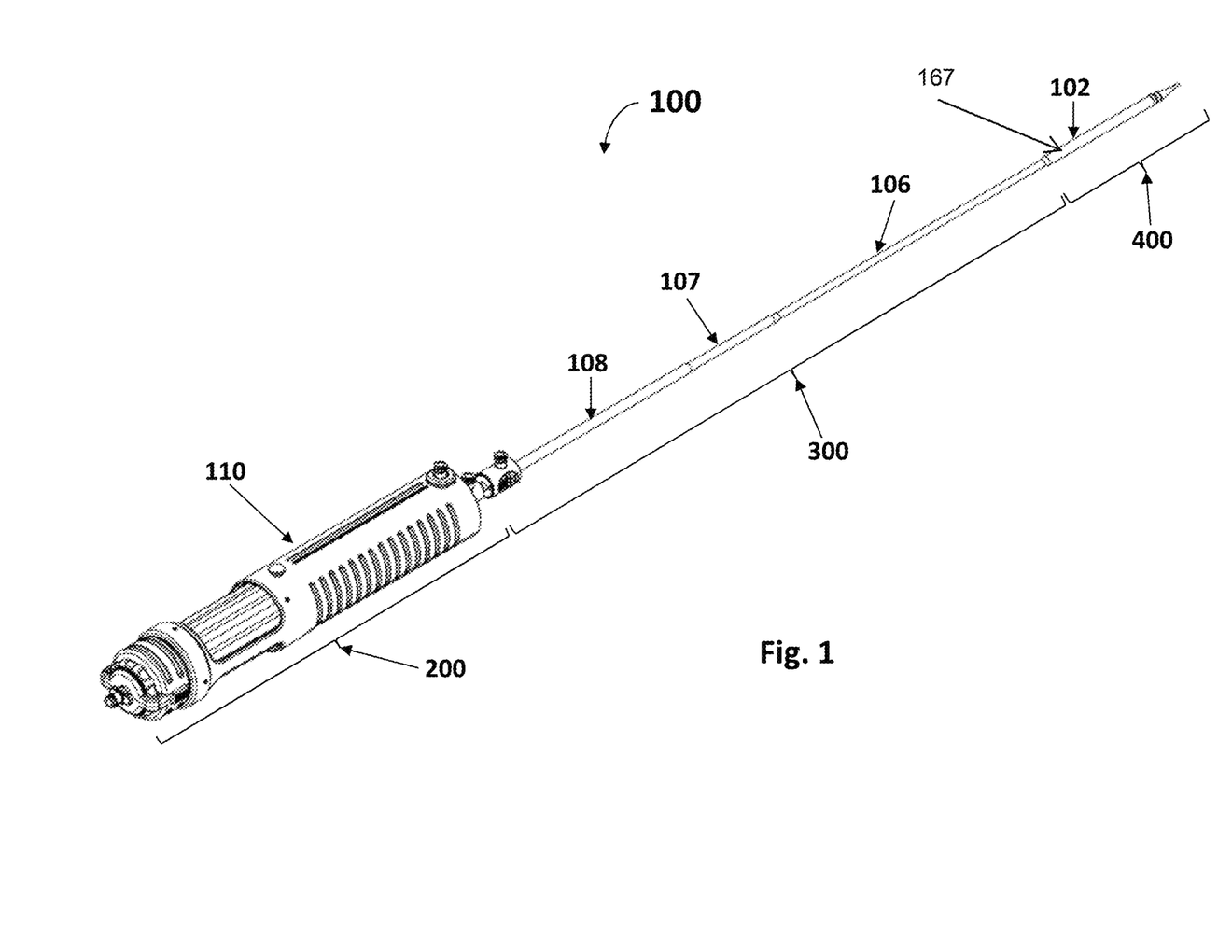
FIG. 1 illustrates an isometric view of a transcatheter delivery system, according to some embodiments.

Referring to FIG. 1, a catheter delivery system (100) comprises a distal section (400), a middle section (300), and a proximal section (200). The proximal end (200) remains outside the human body and comprises a handle housing (112) that encompasses mechanisms to control the movements at the distal end of the catheter.

The middle section (300) is situated between the handle housing (112) and the capsule assembly (166). The middle section comprises an inner shaft (104) that comprises a guidewire shaft (103) permanently attached to it, a catheter shaft (106), a stability shaft (107), and an outer shaft (108). All the shafts are arranged concentrically i.e. over the length of the middle section at a point where all shafts are present, cross sectionally and from the center; the order of the shafts is the guidewire shaft (103), the inner shaft (104), the catheter shaft (106), the stability shaft (107), and the outer shaft (108). The catheter shaft (106) extends from tip (101) till the handle housing (112). Stability shaft (107) remains connected to the handle housing and extends over the catheter shaft (106) whereas the outer shaft (108) is not connected to the handle housing (112) and it is slidable over the stability shaft (107). The outer shaft (108) comprises a hub (114) through which it can be fixed over the length of the stability shaft (107).

Figure 1A:
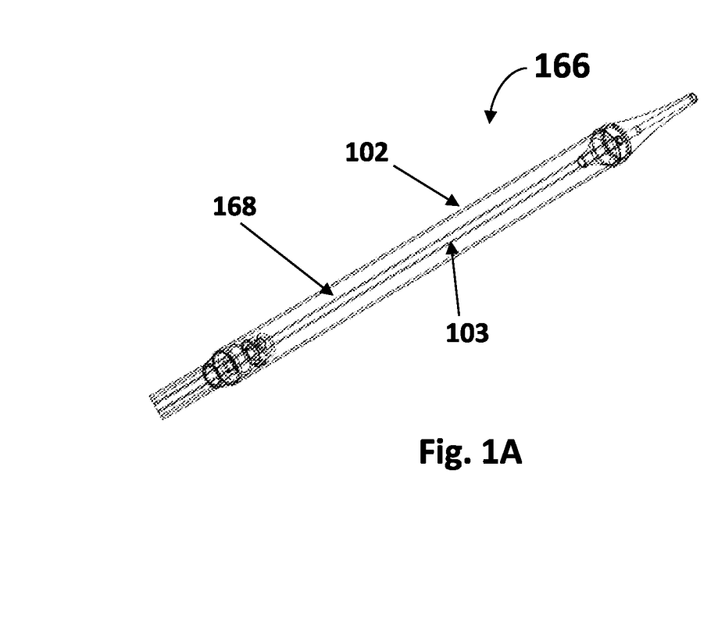
FIG. 1A illustrates a detailed view of a capsule assembly, with capsule in loaded state, present at a distal section (away from the handle) of the transcatheter delivery system of FIG. 1 according to certain example embodiments.
Figure 1B:
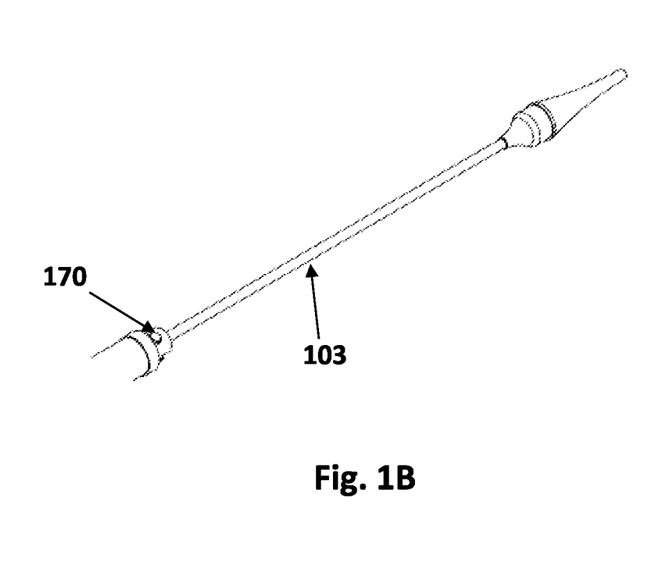
FIG. 1B illustrates a detailed view of a capsule assembly, with capsule in unloaded state, present at a distal section (away from the handle) of a transcatheter delivery system of FIG. 1 according to certain example embodiments.

The distal section (400) of the catheter delivery system (100) mainly comprises a capsule assembly (166), a tip (101) and a guidewire shaft (103). The capsule assembly (166) includes a capsule (102), an implant holding region (168) and an implant holder (170). The capsule (102) of the distal end is seamlessly connected to the other end of the catheter shaft (106). As shown in FIG. 1A, the implant holding region (168) is a space inside the capsule (102) where the prosthetic implant is loaded in compressed form. The implant holder (170) is a hub-like cylindrical structure that is fixed on the inner shaft (104) and situated inside the capsule (102). The implant holders have engaging means to hold the implants. In some examples, the engaging is provided via multiple protrusions on the peripheral surface of the implant holder to thereby facilitate engagement with the implant at the time of loading. The inner shaft (104) starts from the proximal section (200), extends from the middle section (300) and ends near the proximal side of the distal section (400). FIG. 1B illustrates a delated view of the distal section (400) when implant is not loaded and the capsule (102) is retracted back fully. Guidewire shaft (103) starts from the proximal section (200) and extends till the tip (101). At least one radiopaque marker (167) may be included on peripheral surface of a tip (101) of the catheter, the capsule (102), an implant holder (170), or a combination thereof.

Referring to FIG. 2, FIG. 3, FIG. 3A and FIG. 3B, the proximal section (200) comprises mainly a screw-based mechanism for causing movement at the distal section (400). The proximal section is a handle (110) that comprises a handle housing (112), a handle housing cap (144) that has required spaces on its center and on its cross-sectional side to accommodate other elements, a primary screw shaft (116), a casing (118), a threaded wheel (122), a primary rotary knob (124), an indicator slot (136), an indicator pin (138), a ratchet spring (120), a ratchet collar (140), a release button (132), and a push-pull assembly (160) comprising a push-pull button (126), a secondary rotary knob (128), a secondary screw shaft (130) and a push-pull cap (164).

One end of the catheter shaft (106) is seamlessly connected to the capsule (102) and the other end is fixed to a catheter hub (146). As shown in FIG. and FIG. 4A, the catheter hub (146) further comprises an indicator pin (138) that is engaged in the continuous spiral groove (117) cut into the peripheral side of the primary screw shaft (116). The primary screw shaft (116) may be hollow and cylindrical with the continuous spiral groove cut into the side and used to act as a thread of a screw such that, for example, the indicator pin (138) passes through the spiral groove cut. This primary screw shaft (116) is disposed in a casing (118) with longitudinal casing slots (148) on its peripheral surface area. The indicator pin (138) passes through one of the longitudinal casing slots (148). The primary screw shaft (116) is rotatable on its axis, but its longitudinal movement is restricted. On rotating the primary screw shaft (116), the indicator pin (138) moves within the casing slot (148) in longitudinal direction. The handle housing has an indicator slot (136) that is superimposed on the longitudinal casing slot (148) that provides path for longitudinal movement of the indictor pin (138). Hence, the indicator pin (138) also moves in the indicator slot (136). Based on the direction of the rotation, the indicator pin (138) moves either towards the primary rotary knob (124) or away from the primary rotary knob (124). Due to the indicator pin (138) movement, the catheter hub (146) also moves longitudinally and which in turn moves the connected catheter shaft (106). The catheter shaft (106) movement causes the capsule (102) to move backward or forward based on the direction of rotation of the primary rotary knob (124). This movement plays the main role in holding and compressing a compressed prosthetic implant and in releasing the prosthetic implant for deployment. In addition, as shown in FIG. 3B, the peripheral surface area of the primary screw shaft (116) has screw shaft protrusion (150) and opposite to the screw shaft protrusion (150), the casing (118) has protrusion slot (152) to accommodate the screw shaft protrusion (150) in such a manner so that there is no relative longitudinal movement between the casing and the primary screw shaft.

Figure 2:
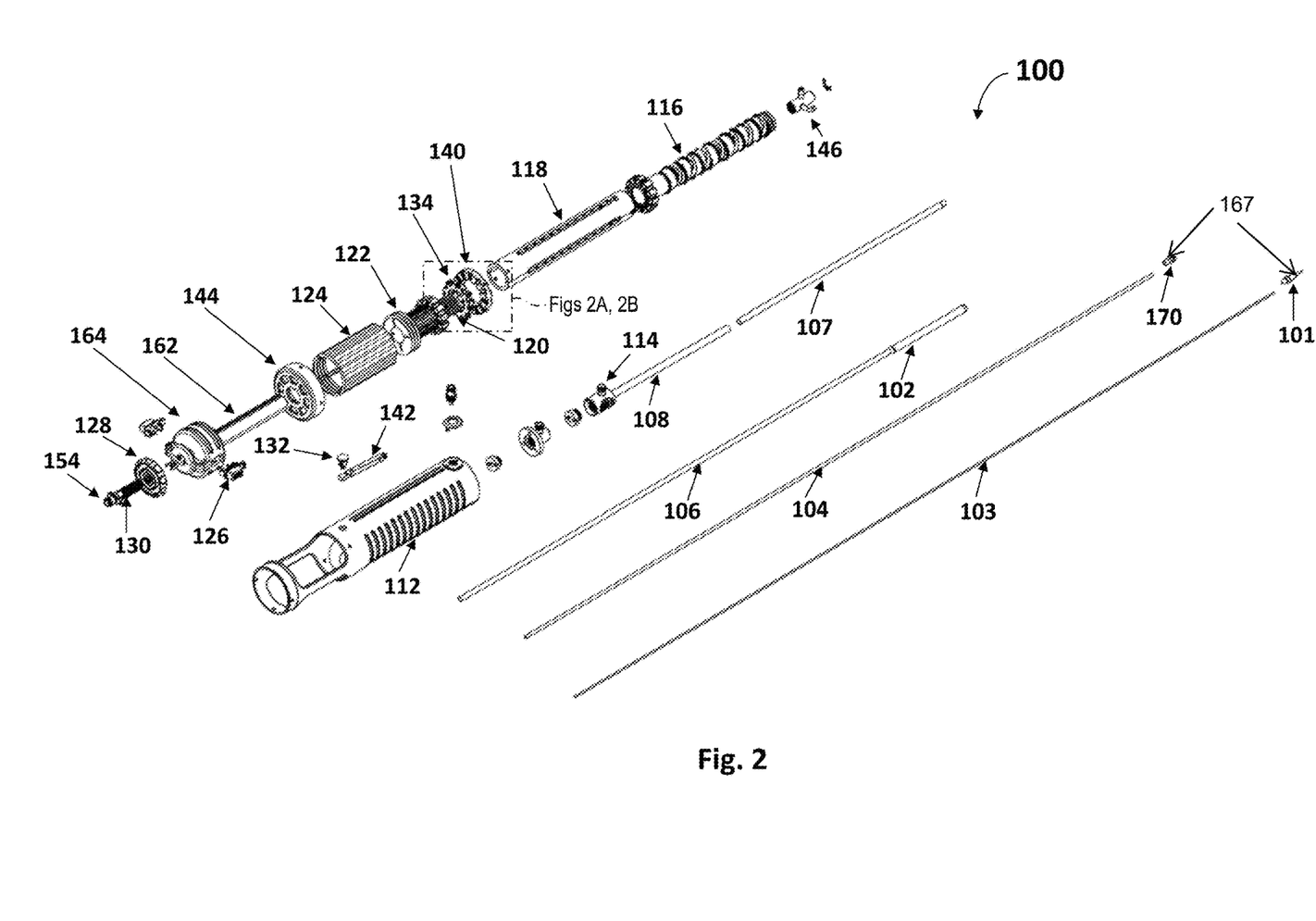
FIG. 2 illustrates a blow-up view of the transcatheter delivery system of FIG. 1 depicting different parts used in assembling the transcatheter system according to certain example embodiments.
Figure 2A:
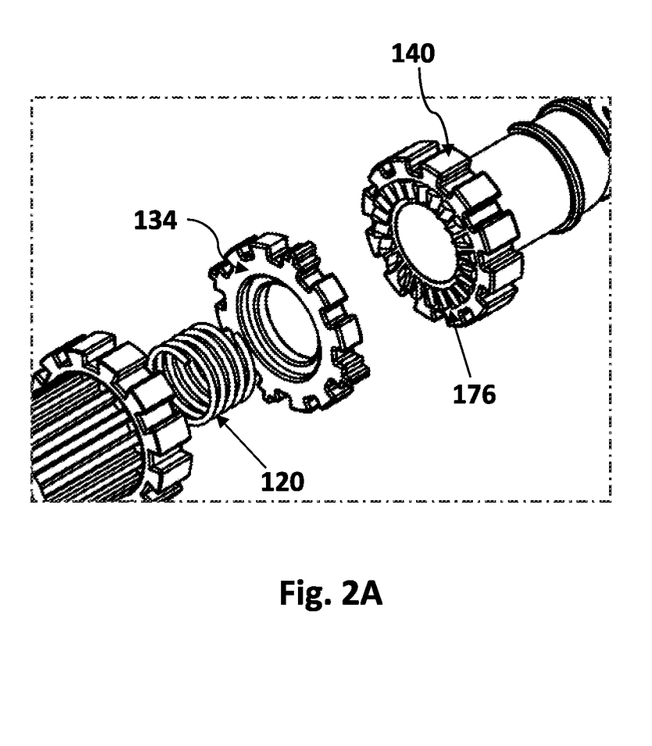
FIG. 2A illustrates a magnified view of section 'A' of the transcatheter delivery system of FIG. 2 depicting parts of ratchet mechanism of the transcatheter system, from an angle to show cogs, according to certain example embodiments.
Figure 2B:
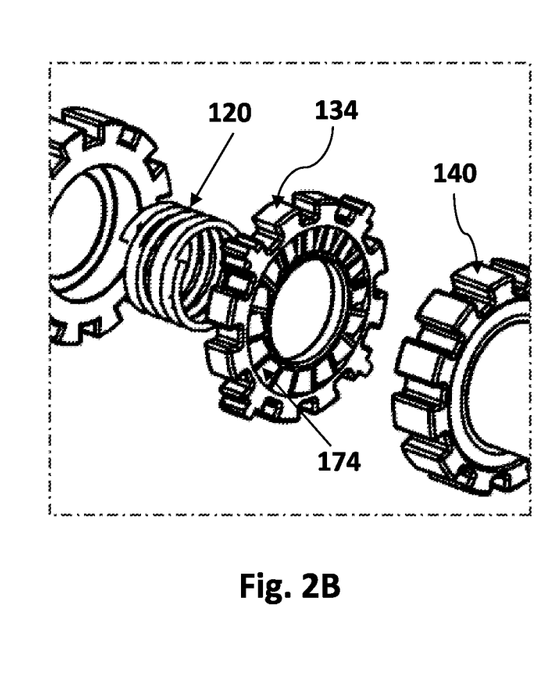
FIG. 2B illustrates a magnified view of section 'A' of the transcatheter delivery system of FIG. 2 depicting parts of ratchet mechanism of the transcatheter system, from another angle to show sockets, according to certain example embodiments.
Figure 3:
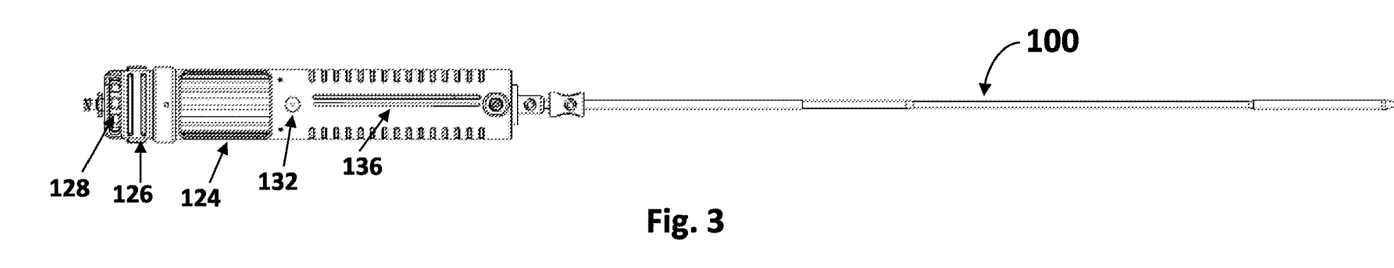
FIG. 3 illustrates a side-view of the transcatheter delivery system of FIG. 1 according to certain example embodiments.
Figure 3A:
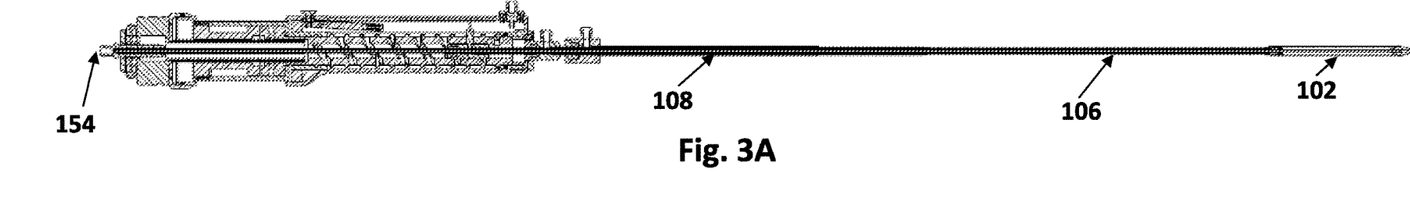
FIG. 3A illustrates a cross-sectional view of the transcatheter delivery system of FIG. 1 according to certain example embodiments.
Figure 3B:
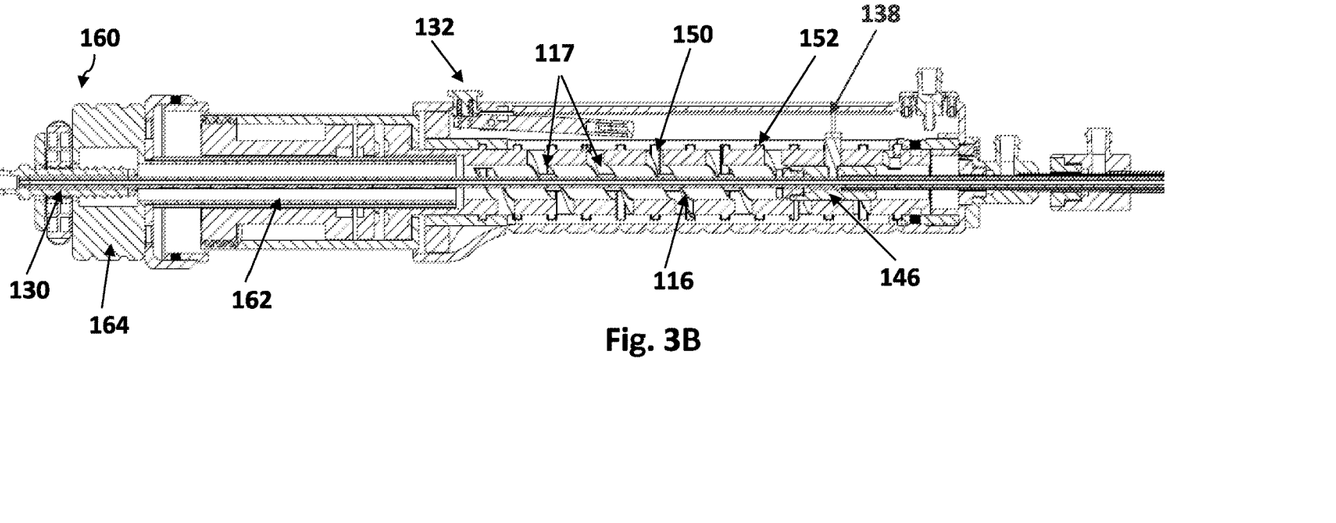
FIG. 3B illustrates a cross-sectional and magnified view of the proximal section of the transcatheter delivery system of FIG. 1 depicting connection of different parts used in assembling the transcatheter system according to certain example embodiments.
Figures 4, 4A:
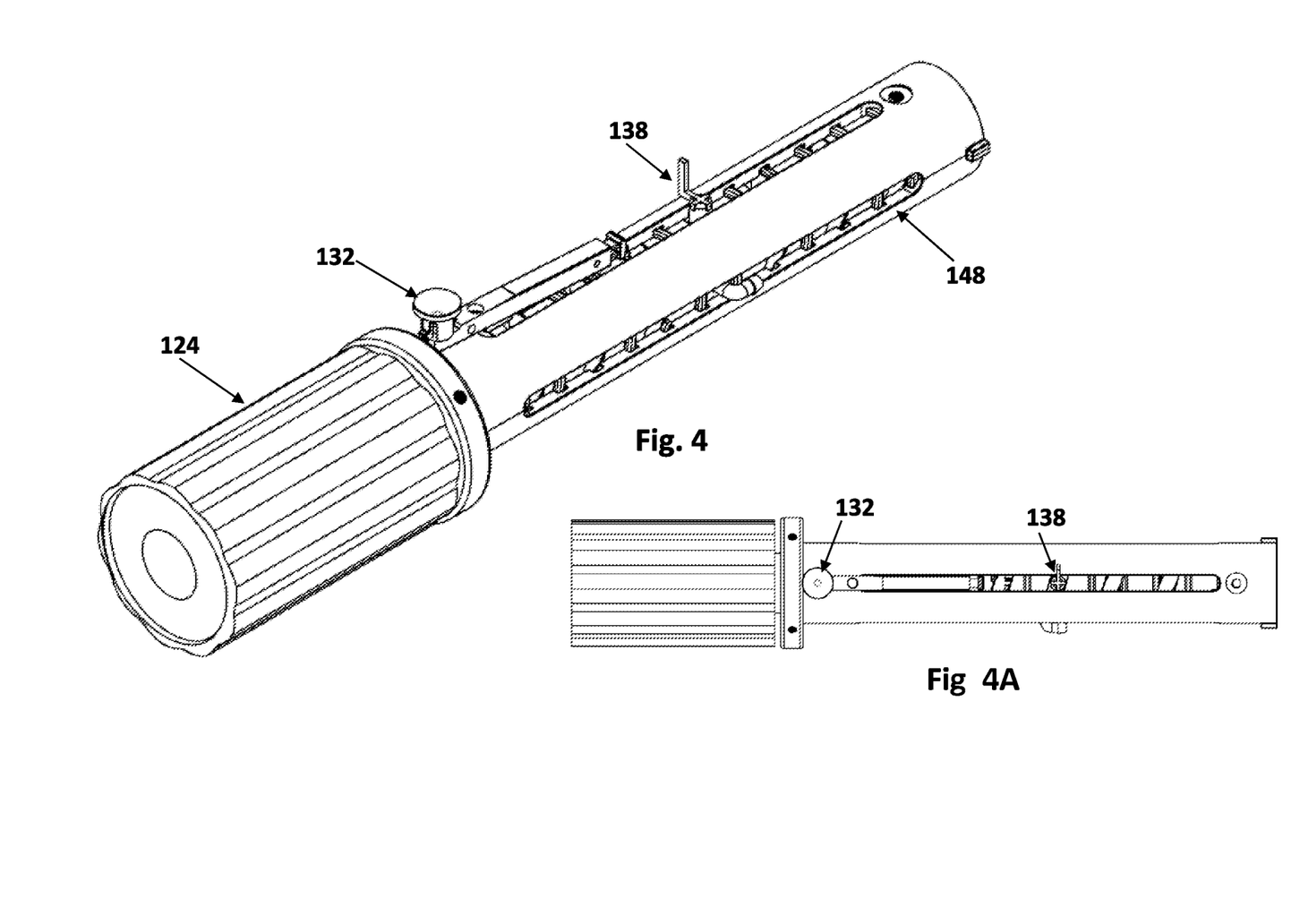
FIG. 4 illustrates an isometric view of a handle of the transcatheter delivery system of FIG. 1 depicting a primary screw shaft and casing according to certain example embodiments.
FIG. 4A illustrates a side view of the handle of the transcatheter delivery system of FIG. 1 depicting primary screw shaft and casing according to certain example embodiments.
Figure 5:
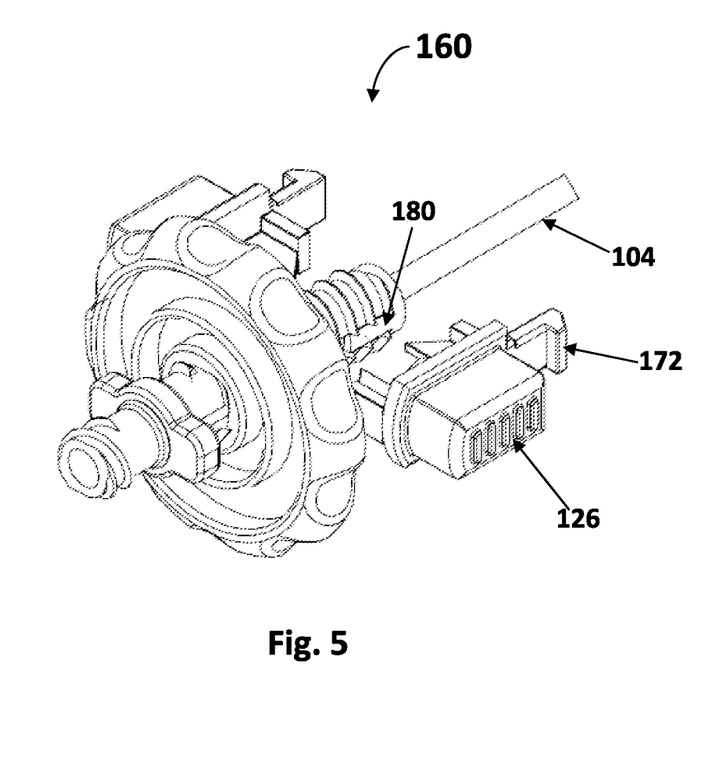
FIG. 5 illustrates an isometric view of the secondary rotary knob assembly of a transcatheter delivery system of FIG. 1, FIG. 2 and FIG. 3 according to certain example embodiments.
Figure 5A:
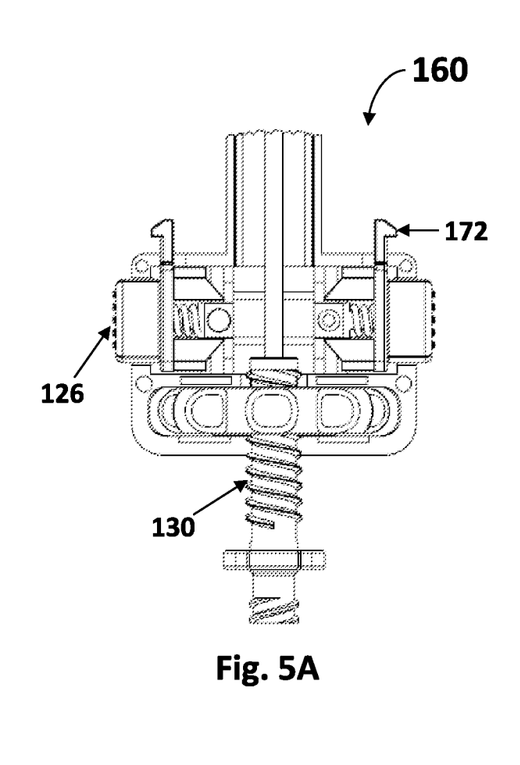
FIG. 5A illustrates a top view of secondary rotary knob assembly of a transcatheter delivery system of FIG. 1, FIG. 2, and FIG. 3 according to certain example embodiments.
Figure 6:
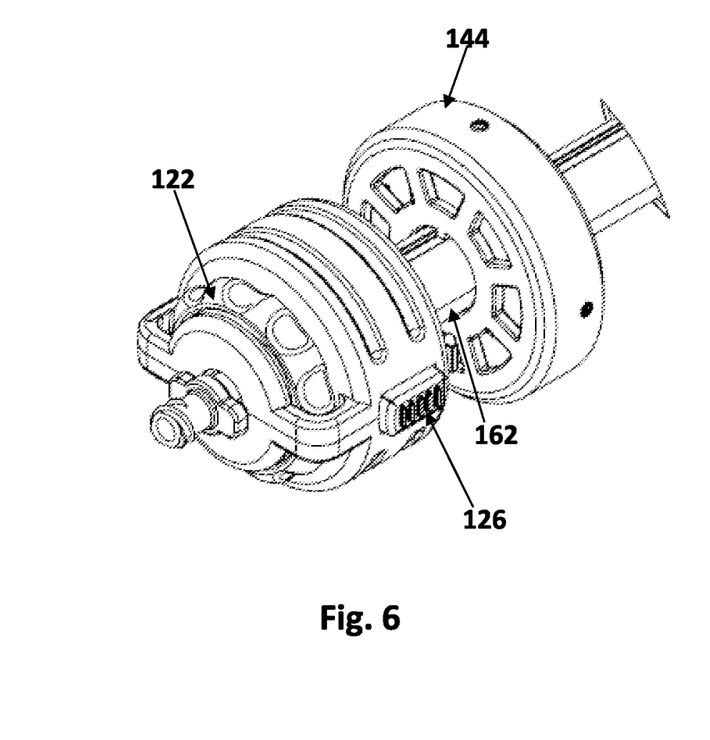
FIG. 6 illustrates an isometric view of push-pull cap attachment of the transcatheter delivery system of FIG. 1, FIG. 2, and FIG. 3 according to certain example embodiments.
Figure 6A:
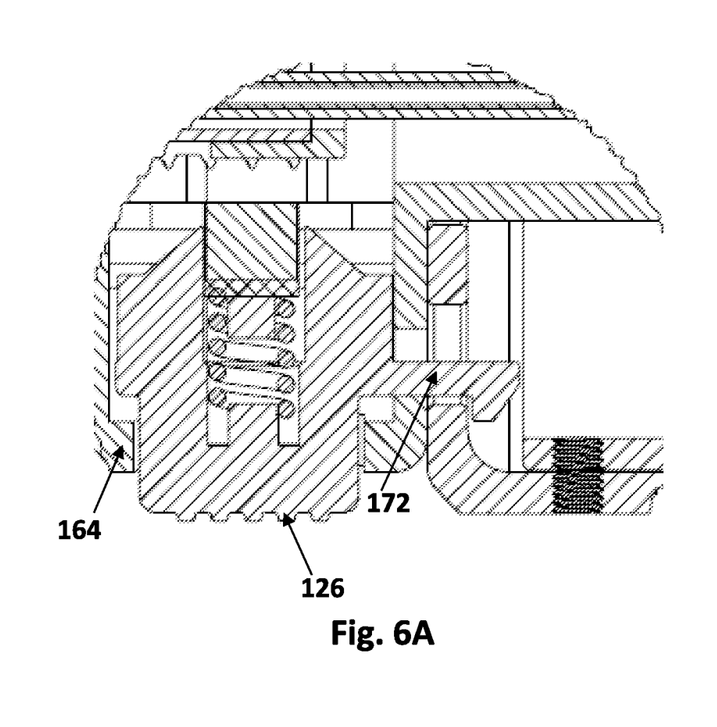
FIG. 6A illustrates a cross-sectional side view of push-pull cap attachment of the transcatheter delivery system of FIG. 1, FIG. 2, and FIG. 3 according to certain example embodiments.

Further, as shown in FIG. 2, FIG. 3 and FIG. 3B, for minor movements, fine positioning and/or deployment of the prosthetic implant, a secondary rotational mechanism can be utilized that is connected with the inner shaft (104) and detachably situated behind the handle (110) of the catheter delivery system (100). The secondary rotational mechanism comprises a secondary screw shaft (130), a secondary rotary knob (128) and a push-pull assembly comprising a pull shaft, a push-pull button (126), two connectors (172), as shown in FIG. 5 and FIG. 5A, and a push-pull cap (164).

The secondary screw shaft (130) is fixedly connected with the inner shaft, and it is in threaded engagement with the secondary rotary knob (128) too. On rotating the secondary rotary knob, the inner shaft moves in longitudinal direction either in forward or backward direction based on the direction of rotation of the secondary rotary knob.

Further, referring to FIG. 5, FIG. 5A, FIG. 6, and FIG. 6A, the push pull shaft (162), attached to the push-pull cap (164), is situated inside the hollow cavity of the threaded wheel (122) but not connected to the threaded wheel (122) or the handle housing (112). The push-pull cap (164) is attached to the handle housing cap (144) through two connectors (172) and this cap can be detached from the handle housing cap (144) using a push-pull button (126). The secondary rotary knob (128) is situated proximally to the push-pull assembly (160) but not attached to the push-pull cap (164). On detaching the push-pull cap (164) from the handle housing cap (144) and pulling towards the operator, the secondary rotary knob (128) also moves and due to this the inner shaft also moves backwards.

The secondary rotary knob (128) is for causing slow small movements in the inner shaft whereas the push-pull assembly (160) is for quick small movements in the inner shaft. One end of the secondary screw shaft is used a guidewire port (154) for guidewire insertion. The guiderail (180) prevents undesired rotational movement of the secondary screw shaft (130).

Figure 7:
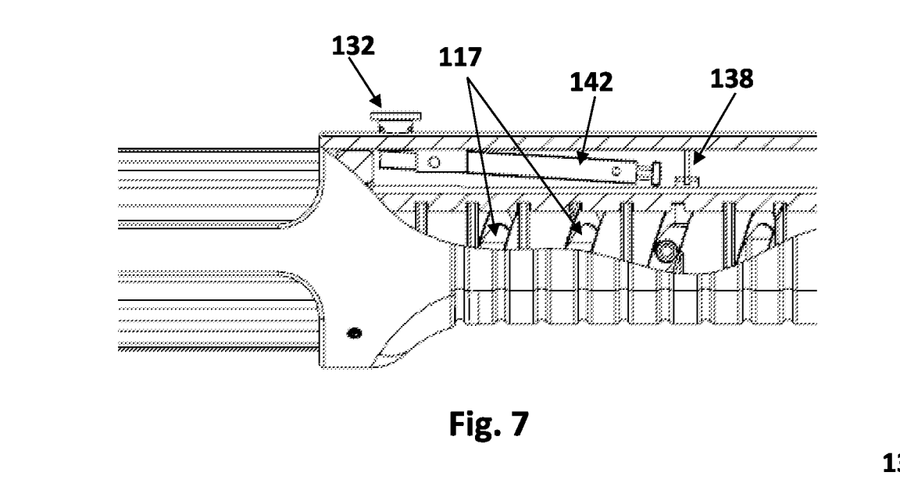
FIG. 7 illustrates a cross-sectional side view of a release button of the transcatheter delivery system of FIG. 1 according to certain example embodiments.
Figure 7A:
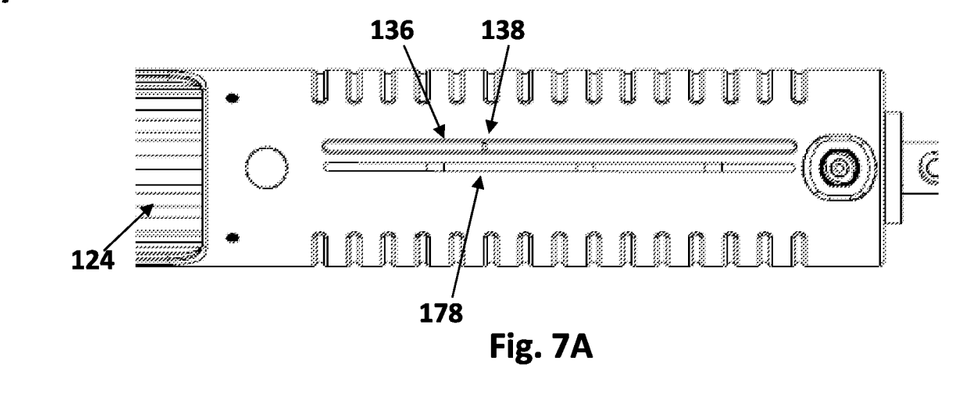
FIG. 7A illustrates a top view of an indicator system of the transcatheter delivery system of FIG. 1 according to certain example embodiments.

Further, the catheter delivery system can include three indicators or mechanisms that are visual, audible, and/or tactile in nature. As shown in FIG. 7 and FIG. 7A, Movement of the indicator pin (138) can be checked on an indicator scale (178) which is a visual feedback mechanism. In addition, as shown in FIG. 2, the primary screw shaft (116) is attached to a ratchet collar (140) and a ratchet spring (120) supported by a ratchet wheel (134) that, on reaching a particular extent of the indicator pin (138) movement, stops transferring the rotational force from the primary rotary knob (124) to the primary screw shaft (116). This happens due to disengagement between the ratchet collar (140) and the ratchet wheel (134) due to the cog (176) and socket (174) design. However, due to continuous force exerted by the ratchet spring (120); the rotational force from the primary rotary knob (124) converts into audible sound that sends feedback to the operator. Further, as shown in FIGS. 7 and 7A, stopping the movement of the indicator pin (138) may also be facilitated by the release button (132). The release button (132) may be the most important of the elements in stopping movement of the indicator pin. The release button is attached to an arm (142) that is placed in the longitudinal movement path of the indicator pin (138) at a predefined calibrated location. The location may be set or otherwise determined based on the extent of the prosthetic implant deployment before which the retrieval of the prosthetic implant is possible. The release button (132) is connected to the arm (142) and the arm (142) is hinged on a point and acts as a lever. By pressing the release button (132), one end of the arm goes down and due to hinge, another end of the arm (142) goes up and displaces from the movement path of the indictor pin (138). Tactile feedback is sensed by the operator once the indicator pin (138) collides with the other end of the release button. The disengagement of the ratchet collar with the ratchet wheel also sends sensory feedback to the operator due to change in rotational force being applied by the operator.

In the present description, for purpose of explanation, specific details are set forth in order to provide an understanding of the present disclosure. It will be apparent, however, to one skilled in the art that that other embodiments may be practiced apart from the specific details described herein. One skilled in the art will recognize that specific details described herein may be incorporated into other embodiments, structures and devices shown in the figures are illustrative according to the exemplary embodiments. In other instances, detailed descriptions of well-known methods, devices, techniques, etc. are omitted so as not to obscure the description with unnecessary detail.

| \multicolumn{2}{c}{List of Reference Numerals} | |
|---|---|
| Number | Element |
| 100 | Catheter delivery system |
| 101 | Tip |
| 102 | Capsule |
| 103 | Guidewire shaft |
| 104 | Inner shaft |
| 106 | Catheter Shaft |
| 107 | Stability shaft |
| 108 | Outer shaft |
| 110 | Handle |
| 112 | Handle housing |
| 114 | Hub |

-continued

| List of Reference Numerals | |
|---|---|
| Number | Element |
| 116 | Primary screw shaft |
| 117 | Continuous spiral groove |
| 118 | Casing |
| 120 | Ratchet Spring |
| 122 | Threaded wheel |
| 124 | Primary rotary knob |
| 126 | Push-pull button |
| 128 | Secondary rotary knob |
| 130 | Secondary screw shaft |
| 132 | Release button |
| 134 | Ratchet wheel |
| 136 | Indicator slot |
| 138 | Indicator pin |
| 140 | Rachet Collar |
| 142 | Arm |
| 144 | Handle housing cap |
| 146 | Catheter hub |
| 148 | Casing slot |
| 150 | Screw shaft protrusion |
| 152 | Protrusion slot |
| 154 | Guidewire Port |
| 160 | Push-pull Assembly |
| 162 | Push-pull shaft |
| 164 | Push-pull cap |
| 166 | Capsule assembly |
| 168 | Implant holding region |
| 170 | Implant holder |
| 172 | Connector(s) |
| 174 | Socket |
| 176 | Cog |
| 178 | Indicator scale |
| 180 | Guiderail |
| 200 | Proximal section |
| 300 | Middle section |
| 400 | Distal section |

The invention claimed is:

1. A percutaneous catheter for delivery of an implant, comprising:
a primary rotary knob engaged with a threaded wheel through threads;
the threaded wheel connected with a primary screw shaft, the primary screw shaft is a hollow cylinder with a continuous spiral groove on a peripheral surface of the primary screw shaft;
a casing attached to a handle housing and encompassing the primary screw shaft therein;
at least one casing slot provided on a peripheral surface of the casing; and
an indicator pin connected to a catheter shaft and engaged in the continuous spiral groove of the primary screw shaft, the indicator pin projects through the at least one casing slot and is movable only in a longitudinal direction, the catheter shaft connected with the indicator pin at one end and a capsule on another end; and
a push-pull assembly that comprises a secondary rotary knob engaged with a secondary screw shaft through threads, wherein the secondary screw shaft is connected to an inner shaft at one end, wherein rotary movement of the secondary rotary knob is configured to cause longitudinal movement of the inner shaft,
wherein the catheter shaft is configured to move in the longitudinal direction based on longitudinal movement of the indicator pin due to rotary movement of the primary screw shaft caused by rotating the primary rotary knob.

2. The percutaneous catheter of claim 1, further comprising a push-pull cap that comprises at least one push-pull button that engages with a cap of the handle housing to attach the push-pull assembly with the handle housing.

3. The percutaneous catheter of claim 2, wherein the push-pull assembly is detachable from the handle housing by activating the at least one push-pull button.

4. The percutaneous catheter of claim 1, wherein the secondary screw shaft includes at least one guiderail that is configured to control rotary movement of the secondary rotary knob.

5. The percutaneous catheter of claim 1, further comprising an indicator slot on the handle housing that provides a travel path to the indicator pin for longitudinal movement on rotation of the primary rotary shaft.

6. The percutaneous catheter of claim 1, further comprising a release button that is configured to restrict the longitudinal movement of the indicator pin at a pre-defined location.

7. The percutaneous catheter of claim 1, further comprising a ratchet wheel connected to the threaded wheel and engaged with a ratchet collar, attached to the primary screw shaft, by a ratchet spring disposed between the threaded wheel and the ratchet wheel.

8. The percutaneous catheter of claim 1, further comprising at least one screw shaft protrusion on the peripheral surface of the primary screw shaft wherein the at least one screw shaft protrusion engages with at least one protrusion slot on an inner peripheral surface of the casing.

9. The percutaneous catheter of claim 1, further comprising an indicator scale configured to show an extent of the implant delivery by movement of the indicator pin along the indicator scale.

10. The percutaneous catheter of claim 1, further comprising an implant holder attached to another end of the inner shaft.

11. The percutaneous catheter of claim 1, further comprising at least one radiopaque marker on a peripheral surface of a tip of the catheter, the capsule, an implant holder, or a combination thereof.

12. The percutaneous catheter of claim 1, wherein the implant is a stent, a valve, a mesh, a balloon, a patch, a drug-containing matrix, a shunt, a vena cava filter, a vascular graft, a stent graft, or a combination thereof.

* * * * *